Nov. 4, 1952  G. W. FYLER  2,617,093
RADIO APPARATUS FOR INDICATING SPEED AND COURSE OF OBJECTS
Filed April 5, 1946  3 Sheets-Sheet 1

Inventor:
George W. Fyler,
by Merton D Moore
His Attorney.

Nov. 4, 1952 G. W. FYLER 2,617,093
RADIO APPARATUS FOR INDICATING SPEED AND COURSE OF OBJECTS
Filed April 5, 1946 3 Sheets-Sheet 2

Inventor:
George W. Fyler,
by Merton D Moone
His Attorney.

Nov. 4, 1952 G. W. FYLER 2,617,093
RADIO APPARATUS FOR INDICATING SPEED AND COURSE OF OBJECTS
Filed April 5, 1946 3 Sheets-Sheet 3

Inventor:
George W. Fyler,
by Merton D. Morse
His Attorney.

Patented Nov. 4, 1952

2,617,093

UNITED STATES PATENT OFFICE 2,617,093

RADIO APPARATUS FOR INDICATING SPEED AND COURSE OF OBJECTS

George W. Fyler, Stratford, Conn., assignor to General Electric Company, a corporation of New York Application April 5, 1946, Serial No. 659,696

15 Claims. (Cl. 343—9)

My invention relates to systems for detecting the presence and position of objects in space by means of a directed beam of high frequency energy, and it has for its primary object to provide new and improved means and methods for determining the speed and true course of an object in space.

In systems for locating the presence and position of an object by means of radio beams, the information usually obtained about an object or target consists of the distance or range to the target, the true bearing angle formed by the target relative to a transmitting antenna of the radio locator system and true north. Height information is also obtainable provided the elevation angle can be accurately determined. It is desirable to have, in addition to the above information, an indication of speed and true course of a moving object, such as aircraft, so that the object may be directed or intercepted as desired. Accordingly, it is another object of my invention to provide a new and improved system for locating an object in space and for determining both the speed and the true course of that object.

It is still another object of my invention to provide a new and improved radio detection and ranging system in which the operator is informed immediately of any change in course of a moving reflecting object, and it is still another object of my invention to provide a new and improved radio detection and ranging system in which a reflecting object may be followed at a considerable range, even though a reflected signal from the object is interrupted for a substantial period of time.

It is a further object of my invention to provide a new and improved radio detection and ranging system in which the course of a moving reflecting object may be predicted with considerable accuracy.

It is still another object of my invention to provide new and improved means for automatically following a moving object in space.

One of the features of my present invention consists in obtaining voltages which correspond to both the radial speed and the bearing speed in space and adding these voltages vectorially to obtain an indication of the true speed of a reflecting object.

The features which I desire to protect herein are pointed out with particularity in the appended claims. The invention itself, together with further objects and advantages thereof, may best be understood by reference to the following description taken in connection with the accompanying drawing in which

Usually in systems employing a beam of high frequency energy for detecting the presence and position of a moving object in space and for following that object through its movements, there are two variables which are employed to perform the function known as "tracking" the object or target. These two variables are the range or distance to the target and the bearing angle of the target with respect to the source of the high frequency beam which is usually a movable antenna. An additional variation of minor effect is produced by a change in elevation angle of the target which may, in some instances, necessitate a change in the elevation of the angle of the antenna to keep the high frequency beam focussed on the target. This invention is directed to the case where the elevation angle is normally low or substantially constant. The two principal variables, range which may be designated by the letter R and the bearing angle which may be designated as $\theta$, may be used to compute the speed and course of a moving target. In order to accomplish this computation, the velocity of the moving target is resolved into two components, one, the component of velocity in the radial or range direction and the other, the component at right angles to the range component, i. e. in the tangential direction.

Figure 1:
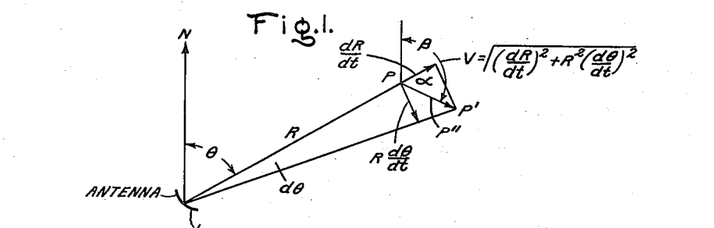
Fig. 1 is a vector diagram illustrating the method of resolving the total velocity of the reflecting object into two components and utilizing these components to obtain the speed and true course of the object.

In Fig. 1 I have shown a vector diagram which illustrates this change in coordinate systems. If we assume that the target is at the point P and has a range of R; a bearing angle $\theta$ relative to the axis of antenna $I$ and the target is arranged to move to a point P' along the line PP' with a velocity V, such movement causes an incremental change in range of $dR$ and an incremental change in bearing angle of $d\theta$. The rate of change of R is then $$\frac{dR}{dt}$$

and represents the radial speed or range component of the total velocity V. The tangential component of V is a function of range, as well as of the rate of change of bearing angle $\theta$, and is equal to $$R\frac{d\theta}{dt}$$

For any incremental change of $d\theta$, the components $$\frac{dR}{dt} \text{ and } R\frac{d\theta}{dt}$$

may be considered to be at right angles and may be added vectorially by taking the square root of the sum of the squares to obtain the total velocity V. The angle $\alpha$ between the direction of the antenna 1 and the line of flight PP' of the target is obtained by use of the formula $$\tan\alpha = \frac{R\frac{d\theta}{dt}}{\frac{dR}{dt}} = \frac{\text{Tangential bearing speed}}{\text{Range Speed}}$$

Addition of the angle $\alpha$ to the bearing angle $\theta$ between the antenna and true north gives the true bearing angle $\beta$ of the true course of the moving target.

My speed and course indication system described above may be used with any radio locator system which employs means for determining the range and bearing angle of a target. One such radio locating equipment is shown in block diagram form in Fig. 2. This equipment consists of a transmitter 2 connected by a wave guide section 3 to the parabolic reflector antenna 1 and arranged in the usual manner to supply periodically repeated pulses of high frequency energy to the wave guide. The end section of the wave guide 3 which projects through the parabolic reflector is inclined slightly with respect to the axis of the antenna 1 so that the antenna radiates a beam of pulsed high frequency energy slightly off the axis of the parabolic reflector. The antenna may include a dipole radiator and reflector 4 supported in front of the end of the wave guide 3 to reflect the high frequency energy into the reflector for proper illumination of the reflector 1. The inclined end section of the wave guide 3 is nutated about the axis of the parabolic reflector of the antenna 1 by means of a motor so that the short dimension of the wave guide and the wave polarization of the emitted wave always remains horizontal. Further, the transmitted beam of energy forms a cone whose axis is coincident with the principal axis of the antenna. This cone is traced out in space at a speed determined by any suitable gearing connection with the motor. A generator 6 is geared to the other end of the driving motor shaft 7. The output of generator 6 at any particular instant is indicative of the mechanical position of the rotating end section of the wave guide 3 and, consequently, indicates the spatial position of the transmitted beam. Thus, the electrical output of the generator 6 may be used as a reference voltage for the position of the antenna beam. The generator 6 preferably has a two-phase output, one phase comprising a pair of conductors 8 and the other phase comprising a pair of conductors 9, so that separation into horizontal and vertical axes may be obtained in a manner to be pointed out later.

Figure 2:
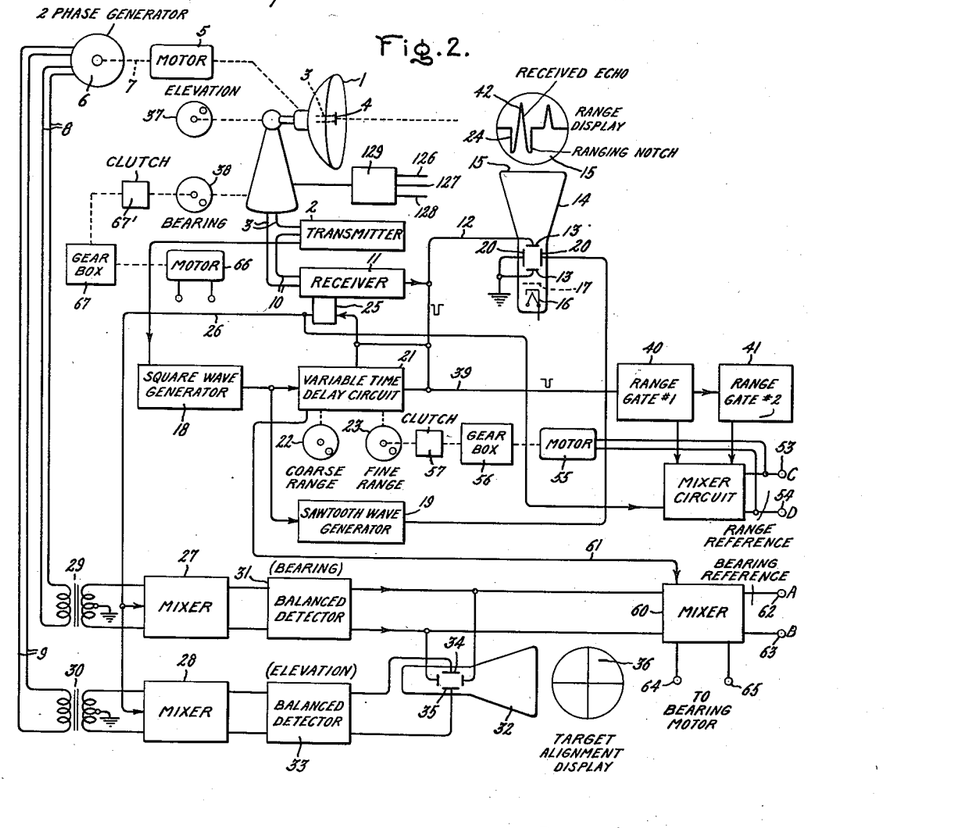
Fig. 2 is a block diagram of a radio locating system embodying my invention.

The pulses of high frequency energy radiated from the antenna 1 after reflection from an object in space are received by the same antenna system 1 and are supplied over the wave guide 3 and an auxiliary guide 10 to a receiver 11. In the receiver, the received pulses are detected and amplified and supplied over a conductor 12 to the vertical deflection plates 13 of a cathode ray oscilloscope 14. The antenna beam rotational rate is sufficiently slow so that the lowest echoes are not received appreciably off the beam of radiation. The oscilloscope 14 has the usual fluorescent end wall 15 upon which the received reflected signal appears as a display. The cathode ray oscilloscope 14 is of the usual type having a cathode 16 which forms a cathode ray, the intensity of which is controlled by the usual grid 17. The pulse transmitter 2 likewise is used to trigger a square wave generator 18 which, in turn, is utilized to control the sawtooth wave generator 19. The generator 19 may be of conventional type and is employed to supply a voltage to horizontal deflection plates 20 of the oscilloscope 14. The voltage applied to the plates 20 by the generator 19 causes the cathode ray beam of the oscilloscope to traverse the end wall 15 repeatedly in a horizontal direction in a well-known manner.

In order to obtain the range or distance to a reflecting object, a variable time delay circuit 21 synchronized with the transmitter 2 by means of the square wave generator 18 is caused to generate a square wave whose position is variable with respect to the transmitter pulse. The square wave provided by the time delay circuit 21 and which is referred to hereinafter as the ranging notch is supplied to the vertical deflection plates 13 by connection to the conductor 12. The range of an echo or reflected pulse is obtained by visually aligning the front edge of the ranging notch and the front edge of the received echo on the screen 15. Such alignment is effected by means of coarse and fine range handwheels 22, 23. By means of these handwheels, the time delay produced by the variable time delay circuit 21 may be varied in any desirable manner, for example, by varying the position of a contact on the potentiometer (not shown) to vary in turn the position of the ranging notch illustrated on the end wall 15 as the rectangular ranging notch 24. Thus, the range of a detected target may be determined continuously by control of the handwheels 22, 23, even though the target has a component of velocity in the range direction and may be read from a scale, not shown, associated with those handwheels.

The square wave generated by the variable time delay circuit 21 and whose time occurrence coincides with that of the ranging notch 24 is supplied likewise to an auxiliary channel 25 of the receiver 11. This auxiliary channel is arranged to amplify only the echo which is contained in the ranging notch. The output of the auxiliary channel 25 is supplied by means of conductor 26 to each of two mixer circuits 27, 28. Also supplied to mixers 27, 28 are the quadrature reference voltages from the two-phase generator 6. Thus, the pairs of conductors 8, 9 are connected, respectively, across the input windings of transformers 29, 30. As each phase of the two-phase generator 6 is supplied to a different mixer, the outputs of these mixers, when supplied with a push-pull excitation from the transformers 29, 30, indicate, respectively, the relative position of the received echo along horizontal and vertical axes. The balanced output voltages from the horizontal mixer 27 may be detected in the normal manner in a balanced detector 31 and the resultant unidirectional voltage is applied to the horizontal deflection plates of a cathode ray oscilloscope 32 used to indicate alignment of the principal axis of the antenna with a reflecting object. In a similar manner, the output of the mixer 28 is detected in a balanced detector 33 and the resultant unidirectional voltage is applied to the vertical deflection plates of the cathode ray oscilloscope 32. If the antenna 1 is aligned with the target so that the echo has the same strength at all positions of the rotating end section of wave guide 3, then all four voltages applied to the cathode ray oscilloscope 32 are equal and the cathode ray beam is undeflected. If, however, the echo is stronger at the top of the cone of revolution generated by the antenna than at the bottom, the voltage on the vertical deflection plate 34 differs from that on the bottom deflection plate 35. The net effect is to shift the cathode ray beam upward, as shown by the display 36 on the screen illustrated adjacent the end of the tube 32 in Fig. 2. This off-center position of the display 36 indicates to the operator that the antenna 1 is directed below the reflecting target. A change of an elevation handwheel 37 which controls the position of the antenna 1 is used to bring the display 36 back to the center of the fluorescent end wall of the cathode ray tube to indicate that the antenna is aligned in elevation with the target. A similar procedure is followed for correction of errors in the bearing signal which is indicated by the display 36 being positioned on one side or the other of a vertical reference line on the end wall of the tube 32. A bearing handwheel 38 is provided to control the position of the antenna 1 to correct for errors in alignment between the antenna and the reflecting target.

From the foregoing description, it is apparent that the position of the range notch 24 and bearing angle of the antenna may be controlled manually by movement of the handwheel controls 22, 23 and the bearing control 38. In accordance with my invention, means are provided to follow automatically the movement of the target in both range and bearing directions to facilitate tracking of the moving object. One such means is illustrated in block diagram form in the remaining portion of Fig. 2 and in schematic form in the circuit of Fig. 3. Also, in Fig. 6, there is shown a timing diagram of the automatic range tracking system.

As previously described, the variable time delay circuit 21 provides a square wave, which wave is supplied over conductor 39 to initiate operation of a multivibrator 40 designated by the legend Range Gate #1. It is apparent that this keying action is coincident with the time of starting of the ranging notch. The multivibrator 40 is so constructed that its output has a duration which is one-half the duration of the ranging notch 24. The circuit labeled Range Gate #1, in turn, is caused to provide a keying pulse to another multivibrator 41 designated by the legend Range Gate #2. The duration of the square wave in the output of Range Gate #2 is likewise made equal to one-half the duration of the ranging notch. Moreover, the time occurrence of the respective output signals or the elements 40 and 41 is such that the square wave in the output of Range Gate #1 corresponds to the first half of the ranging notch 24, while the time occurrence of the square wave in the output of the multivibrator 41 is coincident with the second half of the ranging notch 24. Referring briefly to the timing diagram of Fig. 6, the received echo is designated by the numeral 42. It will be noticed in the timing diagram of this figure that, if the received echo is symmetrically placed about the center of the ranging notch 24, the first half of the received echo occurs during the duration of the square wave 43 in the output of Range Gate #1. Similarly, the rear half of the received echo occurs during the time interval corresponding to the square wave 44 in the output of Range Gate #2.

Figure 3:
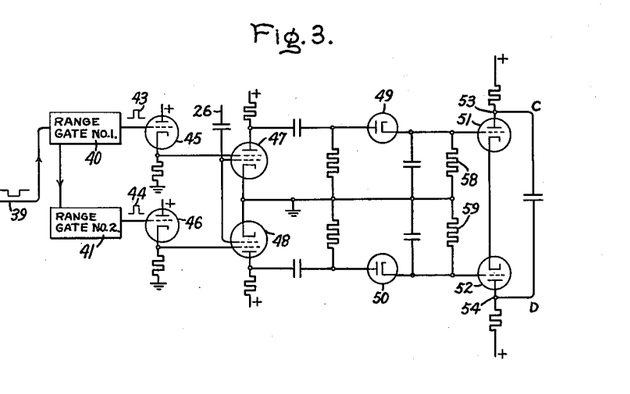
Fig. 3 shows schematically a portion of the circuits employed in the system of Fig. 2 for automatically following a moving target in range.

As shown in Fig. 3, the square waves 43, 44 are supplied, respectively, to the control electrodes of cathode follower tubes 45, 46. The outputs of the tubes 45, 46, respectively, are connected directly to the screen electrodes of two mixer tubes 47, 48. Received echoes coincident with the ranging notch are supplied to the control electrodes of the mixer tubes 47, 48 over the conductor 26 connected to the auxiliary channel 25 of receiver 11. The output voltages of the mixer tubes 47, 48 are supplied, respectively, to the diode detectors 49, 50. These detectors are of the type whose output voltage is proportional to the peak of the wave being detected and their output circuits are directly connected, in turn, to the control electrodes of amplifiers 51, 52. The voltages in the output terminals 53, 54 of the amplifiers 51, 52 are supplied to the armature of direct current motor 55 illustrated in Fig. 2. The motor 55 may be of the permanent magnet field type and is mechanically connected through a suitable gear reduction box 56 and a clutch 57 to the range handwheel 23.

In the operation of the automatic range tracking circuit, if the received echo 42 is symmetrical in time occurrence with respect to the edges of the ranging notch 24, the output voltages of the two detectors 49, 50 developed across resistors 58, 59 are equal and the terminals 53, 54 are at the same potential, with the result that zero voltage is impressed across the armature of the motor 55. If we assume that the echo moves ahead in time occurrence slightly so that more of it is received during the duration of the square wave 43 of Range Gate #1, and less of it during the duration of square wave 44 of Range Gate #2, a greater voltage is developed across resistor 58 than is developed across resistor 59. The difference in potential across resistors 58, 59 is amplified by amplifiers 53, 54 and the amplified voltage is applied across the armature of motor 55. The motor 55 is so connected as to turn handwheel 23 in the variable time delay circuit 21 in a direction to move the ranging notch 24 in the direction of the moving echo 42. It is apparent that, if the echo 42 is moving at a constant speed, the voltage developed between output terminals 53, 54 is proportional to the radial speed of the moving target, i. e., the change in range of the target.

My invention likewise provides means for automatically tracking the moving target as the target changes in bearing angle. The circuits for this purpose are likewise illustrated in block diagram form in Fig. 2. From the previous discussion of the circuits for aligning the display of a target on the fluorescent screen of the cathode ray oscilloscope 32, it is seen that an error voltage is produced in the output circuits of the balanced detector 31 when the target is not aligned with the axis of the antenna 1. This error voltage is employed for automatic bearing tracking purposes by supplying this voltage to a mixer amplifier 60, into which amplifier is also supplied over conductor 61 a voltage proportional to the range of the target and obtained in the output of the variable time delay circuit 21. The potential supplied by conductor 61 is essential for bearing tracking purposes, since the tangential component of speed, as illustrated in Fig. 1, is equal to $$R\frac{d\theta}{dt}$$

The mixer circuit 60 may be conventional in character and across the output terminals 62, 63 thereof there is developed a voltage which is proportional to $$R\frac{d\theta}{dt}$$

the tangential component of the moving target. The mixer circuit 60 likewise has two additional output terminals 64, 65 across which is developed an amplified error signal voltage supplied thereto from the balanced detector 31. The terminals 64, 65 are connected to the armature of a permanent magnet field motor 66 which is, in turn, mechanically connected through a suitable gear reduction box 67 and clutch 67' to the bearing handwheel 38. In this manner, the output of the balanced detector circuit 31 is utilized to perform the operation of an automatic bearing tracking device. If the target is motionless so far as bearing is concerned and the antenna is trained exactly on the target, no voltage will be developed in the output of detector 31 and the bearing motor 66 remains unenergized. However, if the target moves off the center line of the antenna axis, a voltage is developed in the detector circuit 31 and amplified in the mixer 60 which is of a proper polarity to drive the bearing handwheel 38 by means of the motor 66 to again place the antenna axis directly on the target. Thus, if the target is moving at a constant speed, the voltage impressed across motor 66 is proportional to the angular velocity $$\frac{d\theta}{dt}$$

of the target, that is, the rate of change of bearing of the target with respect to the antenna 1.

Figure 4:
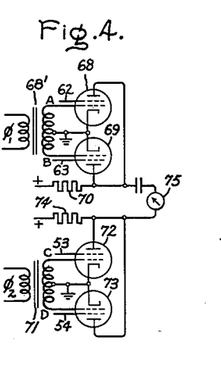
Fig. 4 shows schematically still another portion of the circuit of the system of Fig. 2 employed for obtaining the speed of the moving target.
Figure 5:
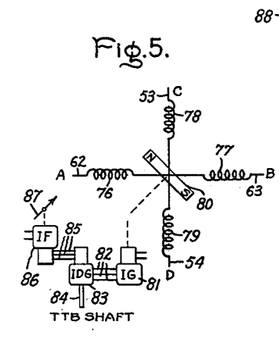
Fig. 5 illustrates schematically apparatus employed for obtaining the true course of a moving target.

Referring now to Figs. 4 and 5, I have there shown circuits in which the voltage developed across terminals 53, 54 which is proportional to the radial speed of the target, and the voltage across the terminals 62, 63, which is proportional to the tangential speed of the target, are utilized to obtain the speed and true course of the moving target. In Fig. 4, an alternating voltage, indicated by the legend $\theta_1$, of any suitable frequency is impressed across the primary winding of the transformer 68'. The output terminals of the secondary winding of the transformer 68' are connected to the control electrodes of amplifiers 68, 69 connected in push-pull. The bearing speed reference signal $$R\frac{d\theta}{dt}$$

is supplied over conductors 62, 63 to the screen electrodes of the amplifiers 68, 69. The anodes of these amplifiers are connected together and are supplied with anode potentials through a common anode load impedance 70. A similar alternating voltage $\theta_2$ of the same frequency as the voltage $\theta_1$, but which is 90 degrees out of phase with the voltage $\theta_1$, is supplied through a transformer 71 to the control electrodes of the amplifiers 72, 73. These amplifiers are connected in push-pull and their screen electrodes are connected, respectively, to the terminals 53, 54 across which is developed a potential proportional to radial speed. The anodes of the amplifiers 72, 73 are likewise connected together and are connected to a source of anode potential through a common anode load resistance 74. If the signals across the terminals 53, 54 and 62, 63 are both balanced, that is, if the target has no component of velocity in either range or bearing, there is no alternating voltage present in the output circuits of the amplifiers 68, 69 or of the amplifiers 72, 73, as the screen electrode voltages of the two sections of each of the push-pull amplifiers are at the same potential and the control electrodes are excited out of phase. However, if the target is moving, the component of velocity in either range or in bearing results in unequal screen voltages in the range or bearing push-pull amplifiers and an alternating voltage proportional to the inequality of the screen potentials is present in the range anode load impedance 74 or in the bearing anode load impedance 70, as the case may be. An alternating current meter 75 is coupled between the anode circuits of the two push-pull amplifiers and reads the total speed of the moving target, since it indicates the vector sums of voltages which are proportional to velocity components disposed at right angles to each other.

In Fig. 5, I have illustrated means for computing and indicating the true course of the moving target. The potentials developed across the terminals 53, 54 and 62, 63 are utilized to produce a magnetic field in the circuits shown in this figure. The voltage across terminals 62, 63 is caused to establish one magnetic field by connection across the series connected winding 76, 77. Similarly, the voltage across the terminals 53, 54 is caused to create another magnetic field by connection across the series connected windings 78, 79. The magnetic fields produced by the pairs of windings 76, 77 and 78, 79 are at right angles to each other. A bar magnet 80, therefore, when suspended in these fields, orients itself in line with the sum of the two magnetic fields and its orientation angle corresponds to the angle $a$ of Fig. 1. In order to obtain the true course of the target, that is, the course of the target with respect to true north, the bar magnet 80 is mechanically coupled to the shaft of a selsyn generator 81 whose stator current is supplied over conductors 82 to the rotor winding of a differential selsyn generator 83 having a rotor and a stator each wound with three-phase windings. The rotor shaft 84 of the selsyn generator 83, in turn, is coupled directly to the true target bearing shaft which is oriented in accordance with the angle $\theta$ in Fig. 1. The output terminals 85 of the stator winding of the selsyn 83, therefore, have voltages developed thereacross which are proportional to the sum of the angle $a$ in accordance with the currents supplied to the rotor winding and to the angle $\theta$ as produced by mechanical rotation of the rotor shaft of the selsyn 83. The output windings 85 are connected to an additional selsyn device 86 on the shaft of which is mounted a true course indicator or pointer 87. The pointer or indicator 87, as a consequence, reads the true course of the moving target under observation.

Figure 6:
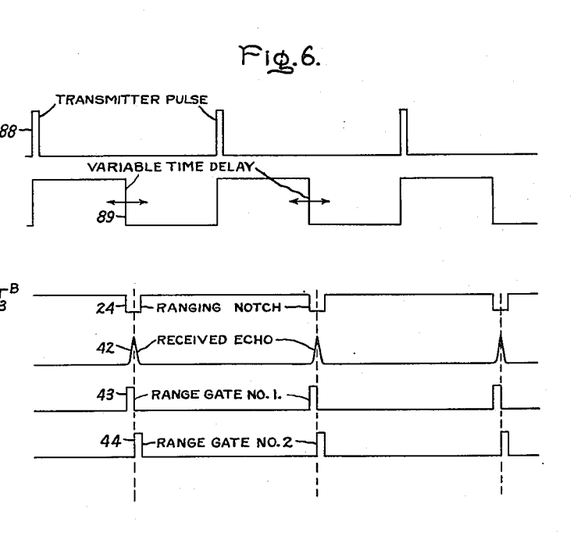
Fig. 6 is a timing diagram illustrating certain operational characteristics of the system of Fig. 2.

In the timing diagram of Fig. 6, there are shown the received transmitter pulse 88 which occurs at regular intervals and the square wave 89 which is developed in the variable time delay circuit 21. The wave 89 is utilized in turn to determine the ranging notch 24. The square wave 43 likewise is determined by the time occurrence of the variable time delay pulse 89, and the square wave 44, on the other hand, is determined by the time occurrence of the square wave 43.

Figure 7:
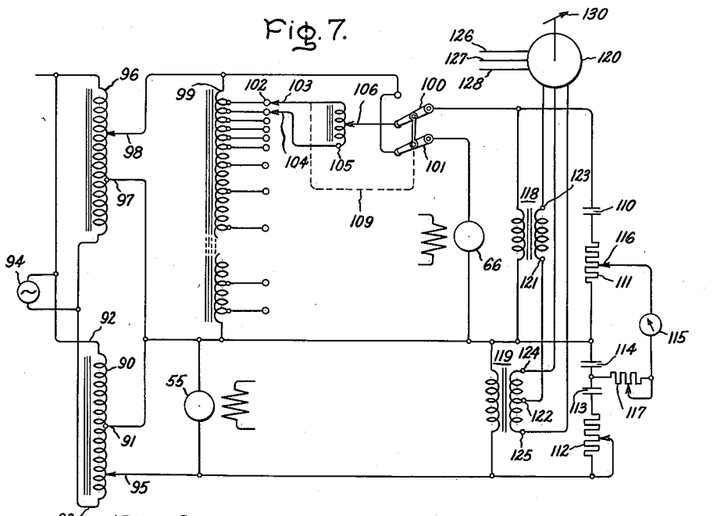
Fig. 7 is a circuit diagram of an alternative arrangement for automatically tracking a target.

Still another means which permits following a moving target without continuously readjusting both the range and bearing handwheels to take care of the change in range and bearing of the moving target is shown in the circuit diagram of Fig. 7, which is employed for controlling the range and bearing motors 55 and 66, respectively. These motors control respectively the operation of the range and bearing handwheels and, for reasons now to be pointed out, both the motors have linear speed voltage characteristics over a wide range of applied voltages. The speed of the range motor 55 is controlled by a range speed control which comprises an autotransformer 90 having a centrally located terminal or tap 91. The input terminals 92, 93 are supplied with an alternating voltage from any suitable source 94 which may be a conventional 110 volt 60 cycle alternating current supply. The potential for the armature of the motor 55 is connected between the center tap 91 and a movable contact 95. With this connection, rotation of the motor 55 may be reversed depending upon the position of the contact 95 relative to the center tap 91.

In a similar manner the bearing motor 66 is supplied with operating voltage from an autotransformer 96 which likewise may be energized from the source 94. The autotransformer 96 has a center tap 97 and a movable contact 98 which are connected respectively to the terminals of an autotransformer 99 which supplies operating potentials to the motor 66 and the indicator circuits through a circuit now to be described.

As pointed out previously in the discussion of Fig. 1, the motion of a moving target may be resolved into two components, one of which varies with the rate of change of range of the target, i. e.

$$\frac{dR}{dt}$$

and the other of which varies with both the range and the rate of change of the bearing of the target, $$R\frac{d\theta}{dt}$$

If it is assumed that the motors 55, 66 have linear speed-armature voltage relationship, then under conditions of target alignment the armature voltage of the range motor 55, when the tap 95 is adjusted so that alignment of the antenna with the target is maintained, is proportional to the radial component of the target velocity, i. e.

$$\frac{dR}{dt}$$

and therefore may be applied directly to indicator circuits. Such alignment of course is indicated, as shown in Fig. 1, when the display of the received echo 42 on end wall 15 is centrally positioned with respect to the ranging notch 24.

The voltage which is supplied to the bearing motor 66, in order that automatic tracking may be maintained, must be a function of both the angular velocity of the antenna and the range of the target, i. e.

$$R\frac{d\theta}{dt}$$

Figure 8:
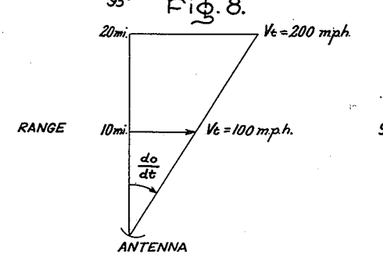
Figs. 8 and 9 are graphs illustrating certain operational characteristics of the system of Fig. 7.

This may be further illustrated by reference to Fig. 8 which indicates that the same voltage is required for the bearing motor to follow a target moving at 200 miles per hour at a range of 20 miles as is required to follow a target moving at a velocity of 100 miles per hour at a distance of 10 miles. The voltage from the autotransformer 96, therefore, must be modified to compensate for the range of the target. Two different such compensating circuits are provided, one for long range operation and the other for short. Furthermore, means are provided for automatically changing from one circuit to the other at a predetermined range. The use of different compensation systems for long and short range results in increased accuracy of readings if the range over which low motor speed is necessary is reduced to a minimum. To this end, a double pole switch including switch members 100, 101 which are mechanically connected together is employed for changing from one circuit to the other.

The circuit of Fig. 7 shows the condition in which the compensation circuit is adjusted for ranges less than a given distance, for example 20 miles. In this condition, the switch member 101 connects the motor directly to the tap 98 so that the output voltage of autotransformer 96 between the taps 97, 98 is supplied directly to the bearing motor. The autotransformer 99 is provided with a plurality of taps 102. Selectively connected across the taps 102 is a multiple throw, double pole switch comprising contacts 103, 104 which are connected respectively to the terminals of a variable transformer 105. The transformer 105, in turn, is provided with variable tap 106 which may be connected to either switch element 100 or switch element 101, depending upon the position of these elements. In accordance with my invention, the contacts 103, 104 are mechanically connected with the coarse range handwheel 22 and the tap 106 is connected with the fine range handwheel 23 so that, for any given setting of the coarse and fine range handwheels, a definite percentage of the voltage supplied to transformer 99 is impressed between the tap 106 and the point 97, the exact percentage depending upon the position of the contacts 103, 104 on the taps 102. Preferably, the winding of the autotransformer 99 is arranged along the circumference of a circle and the contacts 103, 104, being manually connected to the range handwheel 22, are connected across respective adjacent ones of the taps 102 depending upon the position of the coarse range handwheel 22. Similarly, the winding of the variable transformer 105 is arranged along the circumference of a circle and the tap 106, manually connected to the fine range handwheel 23, is operated thereby.

In the compensation circuit used for range distances less than 20 miles, for a given setting of the tap 98 which controls the angular velocity of the antenna, and which setting may be maintained constant when that angular velocity is constant, the voltage applied to the bearing motor 66 is constant. Under this condition, therefore, since $$\frac{d\theta}{dt}$$

is constant the tangential component of velocity $$R\frac{d\theta}{dt}$$

varies directly with the range of the target.

Figure 9:
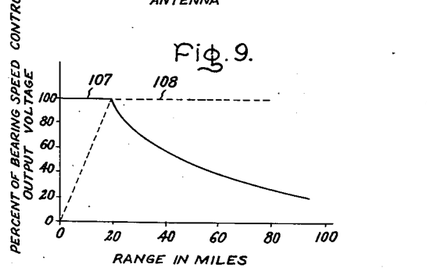

Consequently, the upper five of the taps 102 on autotransformer 99, which taps are used for ranges from zero to 20 miles, are uniformly spaced so that the compensation provided to indicator circuits connected to switch element 100 and which are to be described later will follow a straight line function with varying range. This is illustrated in the curves of Fig. 9 in which the range in miles is plotted as abscissa and the per cent of the bearing speed output voltage, that is, the percentage of the voltage of transformer 99 which is impressed between tap 106 and contact 97, is plotted as ordinate. In this figure, the solid curve 107 denotes the voltage which is impressed across the bearing motor 66 and the dashed curve 108 denotes the voltage which is applied to the indicator circuits. This curve illustrates that the circuits change at a range of 20 miles and that for ranges between zero and 20 miles the potential supplied to the bearing motor 66 is constant, while that supplied to the indicator circuits varies directly with range.

The compensation circuit used for ranges greater than 20 miles is provided when the switch elements 100, 101 are thrown to their upper position connecting the element 100 directly to the tap 98 and the switch element 101 directly to the tap 106. Preferably, this change is made automatically when the range handwheel 22 reaches a predetermined portion of its adjustment. Such mechanical connection is indicated by the dashed line 109 connecting the switch elements 101 with the contacts 103, 104. With this connection, the output voltage of the autotransformer 96 between the taps 97, 98 is applied directly to the indicator circuits and to the autotransformer 99. At the same time, a definite percentage of the voltage supplied to autotransformer 99 is impressed across the armature of the bearing motor 66, the exact percentage depending upon the position of the taps 102 to which the contacts 103, 104 are connected.

For the range of 20 miles to maximum, which may be for example 100 miles, and for a given setting of the tap 98, the voltage delivered to the indicator circuits connected to switch element 100 is constant. Since the angular velocity of the antenna is equal to $$R\frac{d\theta}{dt}$$

the voltage supplied to the bearing motor 66 is varied inversely with the range by means of contacts 103, 104 and contact 106 operated, respectively, by coarse and fine range handwheels 22, 23. To this end, the taps on autotransformer 99 used for ranges from 20 to 100 miles, i. e. the lower taps 102, are so located that a voltage which varies inversely with range is delivered to the bearing motor. The compensation provided by this circuit is represented by the portion of curves 107, 108 in Fig. 9 from the range of 20 to 100 miles. These curves illustrate that the voltage 108 applied to the indicator circuits is constant over this range, while that applied to the bearing motor varies inversely with range.

The armature voltage of the range motor 55 and the voltage which exists between the switch element 100 and the tap 97 are supplied to indicator circuits where they are utilized to obtain the speed and course of a moving target. Considering first the circuits for obtaining an indication of the target speed, the voltages between the points 91, 95 and 97, 100 are two in-phase voltages which represent the velocity components of a target in a tangential and radial direction. In the speed indicator circuit, means are provided to place these voltages in quadrature by shifting the voltages to the extent necessary, one through a negative angle and the other through a positive angle. The first of such phase-shifting networks comprises a capacitor 110 and a resistor 111 which are connected in series between the tap 97 and the switch element 100. The second phase shifting network comprises a variable resistance 112 connected in series with two capacitors 113, 114. An alternating current meter 115 has one of its terminals connected to a variable tap 116 on resistance 111 and its other terminal connected to the common point of capacitances 113, 114 through a variable point 117. A voltage representative of the tangential component of speed is provided to the meter 115 over the variable tap 116. This voltage is shifted through a constant angle of approximately 45° from that which exists between the point 97 and the switch element 100. The magnitude of the tangential component of voltage which is supplied to the meter is adjustable by means of the tap 116 from a value of zero to the full value which exists across the resistance 111. A voltage corresponding to the radial component of speed and which is shifted in phase through a variable angle is supplied to the meter 115 by connection across the capacitor 114. The angle through which the radial component voltage is shifted may be varied from zero degrees to approximately 60° by adjustment of the value of resistance 112. This angle preferably is adjusted to an angle of approximately −45° so that the two voltages supplied to the meter 115 are displaced by 90°.

When the speed indicator circuit has been properly adjusted by the adjustment of tap 116 and the value of resistance 112, equal voltages between the points 91, 95 and 97, 100 produce equal voltages which are in quadrature and the meter 115 indicates the vector sum of these voltages. The actual magnitude of the resultant voltage and its phase depend upon the speed and direction of the target being followed by the equipment. Thus, if the target is approaching along a radial line toward the antenna 1, the tangential component of voltage is zero. The resultant voltage then is assumed to be in the same direction and is of the same magnitude as the radial component of voltage and, of course, is proportional to the speed of the target. As a consequence, the voltage indicated by the meter 115, when that meter has been calibrated by means of the resistance 117 and all adjustments of the tap 116 and resistance 112 have been made correctly, is proportional to the target speed so that the speed of the target may be read directly on the meter 115.

The circuit for indicating the true course of a moving target likewise utilizes the two voltages existing between the points 91, 95 and the switch element 100. These voltages are in phase and are transformed to a three-wire system by means of two Scott connected transformers 118, 119 to provide voltages suitable for energizing the rotor of a differential synchronous generator 120. Thus, the voltage existing between points 91, 95 is impressed across the primary winding of transformer 119 and the voltage between point 97 and the element 100 is impressed across the primary winding of transformer 118. The secondary winding of transformer 118 has one terminal 121 connected to a center tap 122 on the secondary winding of transformer 119. The other terminal 123 of the secondary winding of transformer 118 and the two terminals 124 of the secondary of the winding of transformer 119 form the three wires of the three-phase system. The differential synchronous generator 120 is similar in construction to a conventional synchronous generator, except that the rotor has a distributed, three circuit, Y connected winding instead of the single winding. The stator winding is also a distributed, three circuit, Y connected winding. The three-wire voltage supplied to the rotor of synchronous generator 120 from the terminals 123–125 establishes a magnetic field which varies responsively to the angle $a$ in Fig. 1, that is, the angle between the line of flight of the moving target and the axis of antenna 1. The stator winding of the differential synchronous generator 120 is supplied over conductors 126—128 with voltages which represent the true bearing angle $\theta$ of the antenna as shown in Fig. 1. These potentials may be supplied from any suitable source such as a generator 129 (shown in Fig. 2) connected to the revolving pedestal of the antenna 1. The rotor of the synchronous generator 120 assumes, therefore, a position which equals the sum of the angles represented by the stator and rotor fields. This position of the rotor, which is indicated by a movable pointer 130 attached to a shaft thereof, indicates directly with a cooperating scale (not shown) the true target course $\beta$, that is, the sum of the angles of $a$ and $\theta$.

In the operation of the system just described, by means of the motors 55 and 66 connected with the range and bearing handwheels respectively, the speed of movement of the ranging notch 24 on the cathode ray oscilloscope 14 and the speed and rotation of the antenna 1 in bearing are adjusted so that the axis of the antenna is directed to a moving target. Such alignment of the antenna with the moving target is indicated by the position of the display 36 on the cathode ray tube 32 and the central position of the received echo 42 with respect to the ranging notch 24. When such adjustment is made, the true speed of the moving target is indicated directly on the meter 115 and the true course or bearing of the target is indicated by the position of the pointer 130.

Figures 10, 11:
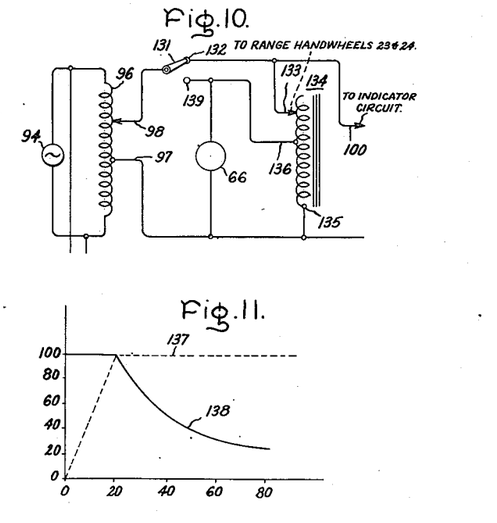
Fig. 10 is still another arrangement for automatically following the target.
Fig. 11 is a graph illustating the operation of the system of Fig. 10.

Fig. 10 illustrates the circuit of still another compensation circuit which may be used to indicate the true speed and course of a moving target in accordance with my invention. This circuit is similar in certain respects to the circuit of Fig. 7 and only sufficient portions of the circuit are shown to indicate the differences. Like elements in the circuits of Figs. 7 and 10 are indicated by like reference numerals. In the circuit of Fig. 10, the variable tap 99 on the autotransformer 96 is connected through a switch 131 to a contact 132 which is connected to a variable tap 133 on a continuously variable autotransformer 134. The autotransformer 134 has one terminal 135 connected directly to the mid point 97 on the transformer 96 and a center tap 136 which is connected to one terminal of the bearing motor 66. The opposite terminal of the bearing motor 66 is likewise connected to the tap 97. With this connection, the output voltage of the transformer 96 is applied directly to the indicator circuits over a conductor 100 which corresponds to the element 100 in Fig. 7. The indicator circuits may be the same as those shown in the circuit of Fig. 5 and are not reproduced in Fig. 10. Thus, the voltage delivered to the indicator circuits is constant for a given setting of the tap 98. The variable tap 133 is mechanically linked to range handwheels 23, 24 so that the voltage supplied to the bearing motor 66 varies inversely as the range. This circuit, therefore, is suitable for indicating the true course and the speed when the range is greater than a predetermined range which may be set, for example, at 20 miles. Thus, referring to the curves of Fig. 11, curve 137 designates the voltage which is supplied to the course and speed indicator circuits and curve 138 indicates the voltage which is impressed across the armature of bearing motor 66. If the range is less than 20 miles, the switch 133 is moved to contact 139 so that the output voltage of the transformer 96 is applied directly to the bearing motor 66. The potentials which are supplied to the indicator circuits with this position of the switch 131 are determined by the position of the tap 133 on the transformer 134. Since the tap 133 is mechanically connected to the range handwheels 23, 24, the potential supplied to the indicator circuits over conductor 100 varies directly with range. The resulting compensation is represented by the portion of curves 137 and 138 of Fig. 11 for a range between zero and 20 miles.

An important advantage of my invention is that the true course and speed of a moving target are indicated at all times. Furthermore, the tracking of a moving target both in range and bearing may be obtained either manually or automatically, simply by the operation of suitable clutching arrangements.

Another important advantage of my system is that, since the antenna is rotated by means of the bearing motor 66 to follow the motion of the moving object, an operator can follow a relatively weak reflected signal during intervals of time when the signal is temporarily interrupted, and, after a brief interval, reappears. Likewise, since the ranging notch 24 may be arranged to move at the same speed as the indication 42 of a moving object, the object may be followed during intervals when the reflected signal is temporarily interrupted.

While I have shown and described certain preferred embodiments of my invention, it will be obvious to those skilled in the art that changes and modifications may be made without departing from the invention. I therefore aim in the appended claims to cover all such changes and modifications as fall within the true spirit and scope of my invention.

What I claim as new and desire to secure by Letters Patent of the United States is:

1. In a radio locating equipment of the type in which pulses of high frequency energy are received from an object in space, means for deriving a signal proportional to the azimuth direction of said equipment relative to a reference direction, means for driving a signal proportional to the distance to said object from said equipment, means for developing a signal proportional to the rate of change of bearing of said object relative to said equipment, means for developing a signal proportional to the rate of change of distance of said object, and means for vectorially combining said signals for deriving a signal indicative of the azimuth of said object with respect to said reference direction.

2. In a radio locating equipment of the type in which high frequency energy is received from an object moving in space, means for developing a first magnetic field of an intensity varying with the radial speed of said object with respect to said equipment, means for developing a second magnetic field of an intensity varying with the range of said object with respect to said equipment and the rate of change of bearing of said object relative to said equipment, said fields being developed transverse to each other whereby a resultant field is produced, and means for modifying the resultant of said transverse fields in accordance with the azimuth direction of the said equipment with respect to a reference direction to obtain an indication of the true course of said object with respect to said reference direction.

3. In a radio locating equipment of the type in which high frequency energy is received from an object moving in space, means for developing a first magnetic field of an intensity varying with the radial speed of said object with respect to said equipment, means for developing a second magnetic field of an intensity varying with the range of said object with respect to said equipment and the rate of change of bearing of said object relative to said equipment, said fields being transverse to each other, means for developing a potential corresponding to the true bearing of said equipment with respect to a reference direction, and means responsive to both said potential and said transverse fields for indicating the true course of said object with respect to said reference direction.

4. In a radio locating equipment of the type in which high frequency energy is received from an object moving in space, means for developing a first potential proportional to the radial speed of said object with respect to said equipment, means for developing a second potential varying with the range and the rate of change of bearing of said object relative to said equipment, a source of two alternating currents having a quadrature phase relationship, means for separately mixing said first and second potentials with a respective alternating current, and means for vectorially combining said mixed potentials to derive a signal indicative of the speed of said object.

5. In a radio locating equipment of the type in which high frequency energy is received from an object moving in space, means for developing a first potential proportional to the radial speed of said object with respect to said equipment, means for developing a second potential varying with the range and the rate of change of bearing of said object relative to said equipment, a source of two alternating currents having a quadrature phase relationship, means for separately mixing said first and second potentials with a respective alternating current, means for combining said mixed potentials to derive a signal indicative of the speed of said object, a source of signals indicative of the direction of said equipment with respect to a given reference direction, and means for vectorially combining said potentials and said signals for producing an indication of the azimuth heading of said object with respect to said reference direction.

6. In a radio locating equipment of the type in which high frequency energy is received from an object moving in space, means for developing a first potential varying with the rate of change of distance of said object with respect to said equipment, means for developing a second potential varying with the distance and the rate of change of bearing of said object relative to said equipment, said potentials being substantially in phase, means for shifting the phase of said first and second potentials to obtain two potentials having quadrature phase relationship, means for vectorially combining said two potentials, and means responsive to said combined potentials for providing an indication of the speed of said object.

7. In a radio locating equipment of the type in which high frequency energy is received from an object moving in space, means for developing a first potential varying with the radial speed of said object with respect to said equipment, means for developing a second potential varying with the distance and the rate of change of bearing of said object relative to said equipment, said potentials being substantially in phase, means for vectorially combining said potentials to derive a three-phase voltage, means for deriving a three phase voltage indicative of the azimuth direction of said equipment with respect to a reference direction, and means for vectorially combining said three-phase voltages for obtaining an indication of the true course of said object with respect to said reference direction.

8. In a radio locating equipment of the type in which high frequency energy is received from an object moving in space, means for developing a first potential varying with the rate of change of distance between said object and said equipment, means for developing a second potential varying with the distance and the rate of change of bearing of said object relative to said equipment, said potentials being substantially in phase, means for shifting the phase of said first and second potentials to obtain two potentials having a quadrature phase relationship, means for combining vectorially said two potentials to obtain a resultant indicative of the speed of said object, means for developing from said first and second potentials a three-phase voltage, means for deriving a three phase voltage indicative of the azimuth bearing of said equipment with respect to a reference direction and means for vectorially combining said three-phase voltages for obtaining an indication of the true course of said object with respect to said reference direction.

9. In a radio locating equipment of the type in which high frequency energy is received from an object moving in space, means for developing a first potential proportional to the rate of change of distance between said object and said equipment, means for developing a second potential varying with the distance and the rate of change of bearing of said object relative to said equipment, said potentials being substantially in phase, a pair of transformers each having a primary winding and an associated two-terminal secondary winding, said primary windings being energized respectively by said first and second potentials, one of said secondary windings having a terminal connected to the mid-point of the other secondary winding, and indicating means responsive to the potential developed across the other terminal of said one secondary winding and said other secondary winding terminals.

10. In a radio locating equipment, means including an antenna for transmitting periodically a moving beam of directive high frequency energy, said equipment being adapted to receive the energy of said beam reflected from an object in space, a viewing screen, means responsive to said transmitted and corresponding reflected energy for producing a first indication on said screen, calibrating means for producing a second indication on said screen adjustable in time occurrence to coincide with said first indication to indicate the distance of said object with respect to said equipment, means for producing a first potential varying with said second indication producing means, means for obtaining a second potential varying in accordance with the orientation of said beam and the intensity of received reflected energy, and means responsive to said second potential to control the position of said antenna relative to said object, said first and second potentials being substantially in phase, means for shifting the phase of said first and second potentials to produce two potentials having quadrature phase relationship, and means for vectorially combining said two phase shifted potentials to indicate the speed of said object.

11. A radio locating equipment comprising an antenna for transmitting recurrently a beam of high frequency energy, means for varying the orientation of said beam, means connected to said antenna for receiving reflections of said beam from a movable object in space, means responsive to energy transmissions and subsequent receptions of corresponding reflections for obtaining a signal indicative of the distance of said object with respect to said equipment, means responsive to the orientation of said antenna and the amplitude of received reflections for obtaining an error signal, and means for utilizing said error signal to control the orientation of said antenna automatically to track said movable object, means responsive to the orientation of said antenna and said distance indication for deriving a first signal, means for determining the rate of change of said distance indication to obtain a second signal, means for vectorially combining said first and second signals to obtain an indication of the velocity of said object with respect to said equipment.

12. An arrangement according to claim 11 wherein said range indication comprises a calibrated variable delay circuit, means for energizing said delay circuit in response to said transmissions, means responsive to the degree of time coincidence of the output signal of said delay circuit and said received reflections for controlling the adjustment of said delay circuit whereby said delay circuit continuously indicates the range of said object with respect to said equipment.

13. An arrangement for determining at a location the position parameters of a remote object moving in space comprising means for developing a first signal varying with the distance of said object with respect to said location, direction finding means for developing a second signal varying with the time rate of change of bearing of said object with respect to said location, drive means for orienting said direction finding means, a bearing indicator circuit, means operable over a given range of distances for applying said second signal to said drive means to control the orienting of said direction finding means and a percentage of said second signal variable substantially directly with said range signal to said indicator circuit, means operable over a higher extension of said range of distances for applying said second signal to said indicator and a percentage of said second signal variable substantially inversely with said range signal to said drive means.

14. An arrangement for locating an object in space comprising means for periodically transmitting pulses of electromagnetic energy in a narrow beam, means for sweeping said beam to scan said space, means for directively receiving said transmitted pulses after reflection from said object in space, a calibrated adjustable delay circuit, means for applying a signal to said delay circuit at the commencement of a given pulse transmission, means for determining the extent of time coincidence of the reception of a reflection corresponding to said pulse transmission with the output of said delay circuit, and means responsive to said last means for automatically adjusting the delay of said circuit for indicating the distance to said object from said equipment, means for deriving an indication of the time rate of change of said distance, means responsive to said received reflections and the sweeping of said beam for adjusting the bearing position of said antenna to follow the motions of said objects in space, means for deriving an indication of the time rate of change of said bearing position, and means for vectorially combining said distance indication, the rate of change of said distance indication and the rate of change of said bearing position indication for indicating the speed of said object.

15. An arrangement for locating an object in space comprising means for recurrently transmitting a pulse of electromagnetic energy in a beam toward said object, means for sweeping said beam to scan said space, an adjustable time delay circuit synchronized with said pulse transmissions for producing output pulses having an adjustable time occurrence subsequent to said transmissions, means for receiving said transmitted pulses after reflection from said object in space, gating circuit means coupled to said delay circuit and to said receiving means for developing a potential corresponding to the rate of change of distance of said object relative the arrangement, and means independently coupled to said delay circuit and including a further connection thereto for providing a potential having a characteristic corresponding to the distance of said object, said last-named means being responsive to time coincidence of said output and received pulses and the sweeping of said beam for controlling the position of said beam to track said object, said further connection applying said last-mentioned potential directly to said means for controlling the positioning of the beam.

GEORGE W. FYLER.

REFERENCES CITED

The following references are of record in the file of this patent:

UNITED STATES PATENTS

| Number | Name | Date |
|---|---|---|
| 974,433 | Renshaw | Nov. 1, 1910 |
| 2,027,527 | Hammond | Jan. 14, 1936 |
| 2,058,306 | Fowler | Oct. 20, 1936 |
| 2,163,746 | Suffit et al. | June 27, 1939 |
| 2,223,224 | Newhouse | Nov. 26, 1940 |
| 2,391,554 | De Forest | Dec. 25, 1945 |
| 2,401,432 | Luck | June 4, 1946 |
| 2,406,358 | Doba | Aug. 27, 1946 |
| 2,408,742 | Eaton | Oct. 8, 1946 |
| 2,410,831 | Maybarduk | Nov. 12, 1946 |
| 2,417,248 | Godet | Mar. 11, 1947 |
| 2,419,541 | De Rosa | Apr. 29, 1947 |
| 2,422,025 | Luck | June 10, 1947 |
| 2,438,112 | Darlington | Mar. 23, 1948 |
| 2,455,265 | Norgaard | Nov. 30, 1948 |
| 2,467,208 | Hahn | Apr. 12, 1949 |
| 2,496,674 | Omberg | Feb. 7, 1950 |